United States Patent Office 3,833,660
Patented Sept. 3, 1974

3,833,660
PROCESS FOR MAKING AROMATIC ALDEHYDES
William E. Smith, Schenectady, N.Y., assignor to
General Electric Company
No Drawing. Filed Apr. 26, 1972, Ser. No. 247,867
Int. Cl. C07c 47/50, 47/56
U.S. Cl. 260—599                                    5 Claims

ABSTRACT OF THE DISCLOSURE

Aromatic aldehydes can be prepared by effecting reaction between an aromatic compound containing a nuclearly bonded hydrogen and hexamethylenetetramine in the presence of trifluoroacetic acid. Upon hydrolysis of the reaction product, the desired aryl aldehydes are obtained.

---

This invention is concerned with a process for making aromatic aldehydes. More particularly, aromatic aldehydes can be obtained by effecting reaction between an aromatic compound of the general formula

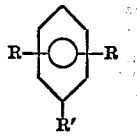

and hexamethylenetetramine in the presence of trifluoroacetic acid, and thereafter hydrolyzing the reaction product to obtain the desired aryl aldehyde, where R and R' may be the same or different members selected from the class consisting of hydrogen, alkyl radicals of from 1 to 6 carbon atoms, phenyl radical, alkoxy radicals containing from 1 to 4 carbon atoms, and the phenoxy radical, and in addition R' can be the hydroxyl radical with the proviso that the remaining R's are not hydrogen.

Many methods have been disclosed in the prior art for preparing aromatic aldehydes. Included among these reactions may be mentioned the Gattermann-Koch synthesis involving, respectively, the use of HCl with HCN and HCl with carbon monoxide in the presence of certain metal halides (see the syntheses by W. E. Truce, Organic Reactions, volume IX, page 37 and N. N. Crounse, Organic Reactions, volume V, page 290). Another well-known method for making the aromatic aldehydes involves the Duff reaction wherein hexamethylenetetramine is treated with an aromatic compound, usually in the presence of glyceroboric acid, to convert the aromatic compound to its formyl derivative [see J. Duff and E. Bills, J. Chem. Soc., 1932, 1987; 1934, 1305; L. N. Ferguson, Chem. Rev., 38, 230 (1946)]. Each of these processes has certain limitations, including limitations as to the aromatic compound with which reaction can take place thus leading to a limited scope of aromatic aldehydes which can be prepared. The Duff reaction is essentially limited to ortho formylation of phenols; in addition to the required conditions being quite rigorous, the yields are generally low, of the order of 15 to 20%.

Unexpectedly, I have discovered that aromatic compounds can be readily formylated through the use of hexamethylenetetramine if one employs in the reaction mixture trifluoroacetic acid. By means of my process, a large variety of aromatic compounds can be transformed to the corresponding aromatic aldehyde including aromatic compounds which do not undergo the transformation under the conditions of the Duff reaction. Furthermore, para substitution is readily obtainable in contrast to the ortho substitution by means of the Duff process, the yields are generally good, the conditions are relatively mild, and the products obtained are easily isolated in a relatively pure state. In the practice of my invention, the aromatic compound is reacted with hexamethylenetetramine in the presence of anhydrous trifluoroacetic acid and subsequent hydrolysis of the reaction product yields the desired aromatic aldehyde which can be readily isolated by extraction and distillation.

Among the alkyl radicals which R and R' may be are, for instance, methyl, ethyl, propyl, isopropyl, butyl, hexyl, 2-ethyl butyl, etc.; alkoxy radicals, e.g., methoxy, ethoxy, isopropoxy, butoxy, etc.

Among the compounds which may be employed in the practice of the present invention may be mentioned, for instance, benzene, toluene, xylene (including all its isomers), 1,3-dibutyl benzene, diphenyl ether, anisole, methoxy benzene, ethoxybenzene, butoxy benzene, phenol, ortho-cresol, meta-cresol, the various xylenols, 2,6-dimethyl phenol, 2,6-di(t-butyl)phenol, 2-phenoxyphenol, 2,4 - diphenoxyphenol, 1,3 - dimethoxybenzene, 2,6-diethoxyphenol, 2-methyl-3-ethylbenzene, 2-methyl-6-ethylphenol, etc.

In general it is only necessary to mix the aromatic compound with the hexamethylenetetramine, add a sufficient amount of trifluoroacetic acid which acts not only as a catalyst but also as a solvent for the reaction. Thereafter, the reaction mixture can be heated at temperatures of the order of 50 to 150° C. or higher for times ranging from about 1 hour to 24 hours or more depending on the reactants employed, the temperature, etc. The trifluoroacetic acid can be readily removed by distillation, preferably under reduced pressure, to yield a concentrated reaction product, which when treated with water, liberates the desired aromatic aldehyde. Advantageously, anhydrous conditions are maintained during the primary reaction.

Generally, it is adequate to employ 1 mol hexamethylenetetramine per mol of the aromatic compound. Obviously, excess concentrations of either of these two reactants can be employed without departing from the scope of the invention. Thus, for each mol of the aromatic compound, one can employ, for instance, from about 0.5 to 2 or more mols of the hexamethylenetetramine.

The concentration of the trifluoroacetic acid can also be varied quite broadly. Generally, enough of the trifluoroacetic acid is used to form a solution of the ingredients and an adequate liquid medium for the reaction to take place. On a weight basis, one may employ from 1.0 to 10 parts of the trifluoroacetic acid per part of the total weight of the two main reactants.

In order that those skilled in the art may better understand how the present invention can be practiced, the following examples are given by way of illustration and not by way of limitation.

EXAMPLE 1

A mixture of 12.2 grams 2,6-xylenol (0.1 mol), 14 grams hexamethylenetetramine (0.1 mol) and 150 ml. trifluoroacetic acid was heated at reflux temperature of 83–90° C. for about 12 hours. The reaction product thus obtained was concentrated by removing the trifluoroacetic acid at elevated temperature under reduced pressure, and the concentrated product (by a rotary evaporator) was combined with 600 ml. ice water. The result of the mixture was stirred for about 15 minutes in the water, made basic with sodium carbonate, and extracted with diethyl ether. Evaporation of the ether solution yielded a yellow solid which when recrystallized from chloroform-pentane mixture gave 14.3 grams (95% yield) of 3,5-dimethyl-4-hydroxybenzaldehyde, m.p. 111–112.5° C.

EXAMPLE 2

A mixture of 13.6 grams 2,6-dimethyl anisole (0.1 mol), 28 grams hexamethylenetetramine (0.2 mol) and 140 ml. trifluoroacetic acid was heated at reflux (84–108° C.) for 3 hours. The products were concentrated, hydrolyzed and extracted with chloroform similarly as was done in Example 1. Distillation of the reaction product yielded 12.1 grams of 3,5-dimethyl-4-methoxybenzaldehyde in about a 74% yield.

EXAMPLE 3

Employing the procedures described in Example 1, a number of other aromatic compounds were reacted with hexamethylenetetramine to yield the corresponding aromatic aldehyde. The following Table I shows the aromatic compounds used, the molar ratio of the hexamethylenetetramine to the aromatic compound, the conditions of reaction, and the products obtained together with the percent yield in each case.

TABLE I

| Aromatic compound | Mol ratio, hexamethylenetetramine to aromatic compound | Product (percent yield) | Heating conditions |
|---|---|---|---|
| p-Xylene | 1:1 | 2,4-dimethylbenzaldehyde (55%) | 96–130° C., 12 hours. |
| Toluene | 1:1 | p-Tolualdehyde (50%), o-tolualdehyde (11%). | 94–126° C., 8 hours. |
| Benzene * | 1:4 | Benzaldehyde (32%) | 125–150° C., 16 hours. |
| Benzodioxane (1,4) | 1:1 | 4'-formalbenzodioxane (1,4) (37%), 3'-formylbenzodioxane (1,4) (2%). | 65° C., 18 hours (nitromethane solvent). |
| Diphenyl-ether | 2:1 | p-Phenoxybenzaldehyde (29%), 4,4'-diformyldiphenyl ether (25%). | 90–130° C., 3 hours. |
| 2,6-di-t-butylphenol | 1:1 | 3,5-di(t-butyl)-4-hydroxybenzaldehyde (60%). | 91–101° C., 6 hours. |
| t-Butylbenzene | 1:1 | Para-t-butylbenzaldehyde (75%) | 96–125° C., 6 hours. |

* Sealed tube at 125–150° C.

It will of course be apparent to those skilled in the art that in addition to the aromatic compounds described in the preceding examples, other aromatic compounds, many examples of which have been given above, can be used without departing from the scope of the invention. Additionally, the conditions employed for making the aromatic aldehyde can be varied widely as is clearly pointed out in the preceding description.

The aromatic aldehydes obtained in accordance with the present invention have many uses. These aldehydes can be reacted with phenols to make resinous compositions useful in the molding and coating arts. In addition, the aromatic aldehydes can be employed as intermediates to form carboxy derivatives thereof by oxidation of the aldehyde group. These carboxy derivatives can then be reacted with various alcohols to make esters which can be used as plasticizers for various organic resins, for instance, polyvinyl chloride resins, cellulose acetate resins, etc.

What I claim as new and desire to secure by Letters Patent of the United States is:

1. The process for making aromatic aldehydes which comprises the steps of effecting reaction between an aromatic compound of the formula

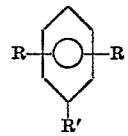

and hexamethylenetetramine in the presence of trifluoroacetic acid and thereafter hydrolyzing the reaction product by treating it with water to obtain the desired aryl aldehydes where R and R' may be the same or different members selected from the class consisting of hydrogen, alkyl of from 1 to 6 carbon atoms, phenyl alkoxy of from 1 to 4 carbon atoms, and phenoxy, and in addition R' can be hydroxyl, with the proviso that the remaining R's are not hydrogen and wherein R and R' are non-tertiary alkyls when adjacent.

2. The process as in claim 1 wherein the aromatic compound is 2,6-xylenol.

3. The process as in claim 1 wherein the aromatic compound is 2,6-di-(t-butyl)phenol.

4. The process as in claim 1 wherein the aromatic compound is benzene.

5. The process as in claim 1 wherein the aromatic compound is diphenyl ether.

References Cited
UNITED STATES PATENTS

| | | | |
|---|---|---|---|
| 2,903,483 | 9/1959 | Berres | 260—600 |
| 3,107,261 | 10/1963 | Gerber | 260—453 |

DONALD G. DAUS, Primary Examiner

J. H. TURNIPSEED, Assistant Examiner

U.S. Cl. X.R.,

260—340.3, 600